United States Patent Office 3,250,825
Patented May 10, 1966

3,250,825
BLENDS OF CRYSTALLINE POLYETHYLENE OR ETHYLENE-BUTENE COPOLYMER WITH AMORPHOUS ETHYLENE-HIGHER α-OLEFIN COPOLYMERS
Robert J. Martinovich, Bartlesville, Okla., assignor to Phillips Petroleum Company, a corporation of Delaware
No Drawing. Filed Nov. 9, 1962, Ser. No. 236,707
8 Claims. (Cl. 260—897)

This invention relates to improved polymeric compositions which are blends of ethylene polymers. In another aspect it relates to plastic film fabricated from such compositions.

This application is a continuation-in-part of my copending application Serial No. 657,064, filed May 6, 1957, now abandoned.

In recent years there has been a substantial increase in the demand for plastic film made from polymers of olefins. The fact that these materials are relatively inert and have low moisture vapor transmissions has made them especially valuable for use in bags for food and chemicals. Although it is not difficult to make film of this type having adequate tensile strength, the development of products with suitable impact resistance is a more serious problem.

I have found that polymeric compositions which are highly suitable for use in the manufacture of bags can be obtained by blending together an ethylene polymer having a density of at least 0.940 gram per cubic centimeter at 20° C. with a copolymer of ethylene and a higher homologue, said copolymer containing not over 75 weight percent ethylene and ordinarily from 15 to 70 weight percent ethylene. The high density ethylene polymer has a high degree of crystallinity while the ethylene copolymer is substantially amorphous. Preferably the copolymer contains from about 20 to 60 weight percent ethylene. According to a preferred aspect of my invention the copolymer is a copolymer of ethylene and propylene and is at least slightly rubbery in character. I further prefer that the ethylene polymer also be a copolymer of ethylene and a higher olefin homologue with a relatively small amount of the higher olefin comonomer incorporated so that the density is not below 0.940, as stated above. Generally the compositions contains a minor amount of the amorphous copolymer, and preferably this copolymer is present in amounts up to 40 weight percent of the total blend. Excellent films can be made from such blends containing 10 to 35 weight percent amorphous copolymer. These film exhibit high impact strength and can be made into heavy duty bags. The blends containing 10 to 25 weight percent amorphous copolymer exhibit excellent impact resistance with good tensile strength. The blends containing 20 to 40 percent and preferably 25 to 35 weight percent amorphous copolymer in addition show good resistance to tear. The compositions are also very resistant to thermal stress cracking.

I have further found that a specific blend of ethylene copolymers has outstanding impact resistance and can be used to manufacture bags which are able to withstand drops from considerable height without breakage. According to this aspect of my invention, a polymeric composition is provided which is a blend of a first copolymer of ethylene and 1-butene, said copolymer having a density of at least 0.940, preferably in the range of 0.946 to 0.954 and more preferably 0.948 to 0.952 gram per cubic centimeter at 20° C., and a second copolymer of ethylene and propylene which contains from 15 to 70 weight percent ethylene, preferably from 20 to 60 weight percent ethylene. Ordinarily these blends contain from 20 to 40 weight percent and preferably from 25 to 35 weight percent of the ethylene-propylene copolymer. Tough heat sealable bags can be fabricated from this composition by molding the film with conventional blown tubing methods.

It is an object of this invention to provide improved polymer compositions.

It is another object of my invention to provide an improved polymeric composition suitable for the fabrication of tough thermoplastic film. Another object is to provide a bag from thermoplastic film which can be used to package and ship chemicals or farm produce in substantial quantities, for example, on the order of 50 pounds or more. Another object is to provide such a shipping container in the form of a thermoplastic bag which has improved resistance to bursting during shipment of the product.

Still another object of this invention is to provide ethylene polymer compositions having improved impact strength and resistance to thermal stress cracking.

Other objects, advantages and features of my invention will be apparent to those skilled in the art from the following discussion.

According to my invention, compositions having improved properties are obtained by utilizing polymers of ethylene having a density of at least 0.94 gram per cc. at 20° C. and preferably 0.96 to 0.99 or higher and a crystallinity of at least 70% and preferably at least 80% at normal atmospheric temperatures as determined by the method of Matthews, Peiser and Richards, Acta. Cryst., 2, 85 (1949). The following procedure is followed in preparing the sample to be tested, to assure a close approach to equilibrium before the crystallinity is determined: (1) The polymer is heated to a temperature about 50° C. above the crystalline melting point; (2) this temperature is maintained for approximately one hour; and (3) the polymer is then cooled to room temperature at a rate characterized by a fall of 1.50° C. per minute at 135° C. The preceding treatment is carried out in an environment essentially free of oxygen.

The ethylene polymers used in the preparation of the composition of this invention are prepared usually by contacting the olefin to be polymerized with a catalyst at an elevated temperature and pressure, preferably in the presence of the solvent or diluent material. The temperature required for polymerization varies over a wide range; however, usually it is preferred to carry out the reaction at a temperature between about 150° F. and about 450° F. The particular temperature to be employed in each individual case depends on the catalyst used, the olefins to be polymerized and the operating conditions employed such as pressure, space velocity, diluent to olefin ratio etc.

The term "ethylene polymer" is used in its generally accepted sense to include homopolymers of ethylene and copolymers of ethylene with comonomers, particularly other mono-1-olefins having 3 to 8 carbon atoms such as propylene, 1-butene, 1-pentene, 4-methyl-1-pentene, 1-octene, and the like. The ethylene predominates in these polymers and the amount of 1 or more comonomers incorporated is limited so that the density of the polymer is not below 0.940. This in effect limits the comonomer in the polymer to a proportion substantially smaller than the percent of comonomer in the substantially amorphous copolymer, as stipulated above. For simplicity the term "ethylene polymer" is used to designate the high density, substantially crystalline polymer, while the term "copolymer" not further limited by density is used to refer to the substantially amorphous polymer containing ethylene and a relatively high amount of comonomer.

The polymerization pressure is often maintained at a sufficient level to assure a liquid phase reaction, that is at least about 100 to 300 p.s.i.g., depending upon the type of feed material and the polymerization temperature. Higher pressure up to 500 to 700 p.s.i.g. or higher can be used, if desired. When utilizing a mobile catalyst the catalyst concentration in the reaction zone is usually maintained between about 0.01 and about 10 percent by weight and the residence time can be from 10 minutes or less to 10 hours or more. With a fixed bed the liquid feed rate can vary from as low as 0.1 to about 20 volumes of feed per volume of catalyst per hour, with the preferred range being between about 1 and about 6 volumes per hour.

A preferred polymerization method is described in detail in copending application of Hogan and Banks, Serial No. 573,877, filed March 26, 1956, now Patent No. 2,825,721. This particular method utilizes a chromium oxide catalyst, containing hexavalent chromium, with silica, alumina, silica-alumina, zirconia, thoria, etc. In one embodiment of this application, olefins are polymerized in the presence of a hydrocarbon diluent, for example an acylic, alicyclic or aromatic compound which is inert and in which the formed polymer is soluble. The reaction is ordinarily carried out at a temperature between about 150° F. and about 450° F. and usually under a pressure sufficient to maintain the reactant and diluent in the liquid state. The ethylene polymers produced by this method are characterized by having an unsaturation which is principally either transinternal or terminal vinyl, depending on the particular process conditions employed. When low reaction temperatures, about 150° F. to about 320° F., and a mobile catalyst are used for polymerization, the product polymer is predominantly terminal vinyl in structure. When polymerization is carried out at higher temperatures and in a fixed catalyst bed, the polymer has predominantly transinternal unsaturation. Polymers prepared by both methods are also characterized by their high densities and high percentage of crystallinity at normal atmospheric temperatures. The ethylene polymers which are preferred in the compositions of this invention have a density of at least 0.94 gram per cc. at 20° C. and preferably 0.96 gram per cc. or higher and a crystallinity of at least 70% and preferably at least 80% at normal room temperatures.

Other less advantageous and nonequivalent procedures which employ different catalysts are also used for preparing ethylene polymers. For example, polymers are prepared in the presence of organometallic compounds such as triethyl aluminum plus titanium tetrachloride, mixtures of ethylaluminum halides with titanium tetrachloride, and the like. Another group of catalysts which is used comprises a halide of a Group IV metal such as, for example, titanium tetrachloride, silicon tetrabromide, zirconium tetrachloride, tin tetrabromide, etc. with one or more free metals selected from the group consisting of sodium, potassium, lithium, rubidium, zinc, cadmium and aluminum.

The solvent or diluent employed in the polymerization reaction includes in general, paraffins which dissolve the polymers at the temperature employed in the reaction zone. Among the more useful solvents are paraffins having between about 3 and about 12 carbon atoms per molecule, such as, for example, propane, isobutane, n-pentane, isopentane, isooctane, etc., and preferably those paraffins having 5 to 12 carbon atoms per molecule. Also useful in the polymerization reaction are alicyclic hydrocarbons, such as cyclohexane, methylcyclohexane etc. Aromatic diluents are also used, however in some instances they (or impurities therein) tend to shorten the catalyst life, therefore their use will depend on the importance of catalyst life. All of the foregoing and in addition other hydrocarbon diluents which are relatively inert and in the liquid state at the reaction conditions may also be employed in carrying out the reaction of olefins to form solid polymers.

The copolymers used in the compositions of this invention are obtained by the copolymerization of ethylene with higher 1-olefins, preferably in the presence of a diluent or solvent material. The reaction is usually carried out at a temperature of between about 210° F. and about 300° F. The polymerization pressure is usually maintained at a sufficient level to assure a liquid phase reaction that is at least about 100 to 300 p.s.i.g. depending upon the polymerization temperature. High pressures up to 500 to 700 p.s.i.g. or higher can also be used if desired. The reaction can also be carried out in the gaseous phase, in which case the pressure can be as low as atmospheric. The polymerization reaction can be carried out either as a fixed bed or a mobile catalyst operation. The feed rate in a liquid phase process with a fixed bed catalyst can vary from as low as about 0.1 to about 20 volumes of feed per volume of catalyst per hour, with the preferred range being between about 1 and about 6 volumes per volume per hour. When a mobile catalyst system is used the catalyst concentration in the catalyst zone is usually maintained between about 0.01 and about 10% by weight and the residence time can be from 10 minutes or less to 10 hours or more.

The higher 1-olefins employed as feed materials in the copolymerization reaction include in general 1-olefins having more than two carbon atoms. Particularly useful are 1-olefins containing from 3 to 8 carbon atoms and having no branching closer to the double bond than the 4 position, for example, propylene, butene-1, pentene-1, hexene-1, etc. The following discussion will be directed to compositions in which the copolymer is prepared by the reaction of ethylene and propylene, however, this is not intended in any limiting sense and it is within the scope of the invention to utilize other 1-olefins in the preparation of the copolymers. Ethylene and 1-butene or copolymers of ethylene and 1-pentene can be prepared and used in a manner analogous to that illustrated with the copolymers of ethylene and propylene. Also contemplated are terpolymers of ethylene and two different comonomers such as a terpolymer of ethylene, propylene and 1-butene or a terpolymer of ethylene, propylene and a more unsaturated monomer such as butadiene.

The composition of the copolymer which is blended with the ethylene polymer to form the compositions of this invention depends on the particular higher 1-olefin present in the copolymer. According to one aspect of my invention, when polymerizing ethylene and propylene the proportions of the monomers are controlled to provide a copolymer containing between about 35 and 70% of ethylene by weight and preferably about 60%. The copolymer can be used in the polymer blend preferably in amounts up to about 40% of the total blend. Higher concentrations of the copolymer improve the impact strength of the blend, however, some sacrifice in other desirable properties such as tensile strength may result. As in the preparation of the ethylene polymers the use of a diluent in the copolymerization reaction serves two functions, namely it dissolves the copolymer and also provides close control of the reaction temperature. With respect to the solvent or diluent employed in the copolymerization reaction the same factors are important as in ethylene polymerization and similar materials are used. The catalysts employed in the preparation of the copolymer include the chromium oxide catalysts of Hogan and Banks, previously mentioned. For a detailed discussion of these catalysts, their composition and their methods of preparation, reference can be had to the copending application of Hogan and Banks, Serial Number 573,877, filed March 26, 1956, now Patent No. 2,825,721, wherein the catalysts are discussed in detail.

In addition to the chromium oxide catalyst the copolymers can be prepared in the presence of trialkyl aluminum compounds and compounds of metals of subgroups 4–6 of the periodic system including thorium and uranium. The preparation of these catalysts is well known, for example, the aluminum trialkyls can be prepared by the action of alkyl halides on aluminum magnesium alloys. Another method of preparation involves the reaction of anhydrous aluminum chloride with alkyl magnesium salts dissolved in ether.

The major component of the composition in one preferred aspect of my invention is a substantially crystalline copolymer of ethylene and 1-butene. The preferred copolymer has a density as hereinafter defined of about 0.948 to 0.952. This density represents an incorporation of about 1 to 1½ weight percent of 1-butene, based on the total monomers, into the copolymer molecule. The density of the copolymer is decreased as additional 1-butene is incorporated into the polymer. The copolymer which provides the best result is that having a density of about 0.950 to 0.951 and having a melt index of about 0.3. These copolymers can be prepared by a number of different methods but the procedure described in U.S. Patent 2,825,721 is preferred. Other methods which employ catalyst systems containing organometal compounds, such as those disclosed in the patent to R. A. Findlay, U.S. 2,846,427, issued August 5, 1958, can also be used.

The density values for the purpose of defining the materials used in my invention are expressed in grams per cubic centimeter and determined at 20° C. by any accepted procedure using a solid specimen of polymer at thermal equilibrium. A suitable specimen can be obtained by compression molding the polymer at 340° F. until completely molten and then cooling to 200° F. at a rate of about 10° F. per minute. The molded polymer is then cooled to 150° F. at a rate not exceeding 20° F. per minute, removed from the mold, and cooled to room temperature. The melt index of the polymer is determined in accordance with ASTM Method D 1238–52T.

The ethylene-propylene copolymers are substantially amorphous materials which contain between about 15 and 70 weight percent ethylene and about 85 to 30 weight percent propylene. Preferably this copolymer contains from 20 to 60 weight percent ethylene with the balance propylene. Very strong films are provided when the copolymer contains about 20 to 30 weight percent ethylene. This copolymer can also be prepared using the process described by the above-mentioned patent to Hogan and Banks. More frequently the process used involves a catalyst of trialkylaluminum with a compound of a metal of Groups IV to VI of the periodic system. One suitable method for preparing polymers of this type is by the use of a catalyst of triisobutylaluminum and titanium tetrachloride.

Ordinarily, the compositions are made by blending the copolymers by milling at a temperature above their softening points. The polymers can be mixed in solution and recovered in admixture by solvent evaporation or by precipitation. Minor amounts of antioxidant such as phenyl-beta-naphthylamine, plasticizers, dyes and pigment can be admixed with the polymers prior to or during the blending operation. Ordinarily the blends contain from 20 to 40 weight percent ethylene-propylene copolymer and from 60 to 80 weight percent ethylene-butene copolymer. Improved properties are obtained with compositions which contain from 25 to 35 weight percent ethylene-propylene copolymer and from 65 to 75 weight percent ethylene-butene copolymer. The most highly preferred compositions contain from 28 to 32 weight percent ethylene-propylene copolymer and from 68 to 72 weight percent of the ethylene-butene copolymer. A 30–70 blend of these copolymers has been found to give superior results.

The blends can be rolled into sheets or film, or tubestock can be made by the standard blown tubing method. Oriented film can be made by known methods involving placing the film under tension with or without simultaneous expansion or inflation at orientation temperatures. When the extruded film is obtained in the form of a tube, one end can be closed by sealing to form an open bag. Sealing of these compositions can be effected by purely thermal methods or by using adhesives or pressure-sensitive tape. The film used for bag manufacture ordinarily has a thickness of about 4 to 9 mils, preferably 5 to 7 mils.

In order to illustrate my invention further the following examples are presented. The conditions and proportions used in these examples are typical only and should not be construed to limit my invention unduly.

*Example I*

Seventy parts by weight of an ethylene/1-butene copolymer having a density of 0.950 and a melt index of 0.3 was blended with 30 parts by weight of an amorphous ethylene-propylene copolymer which contained about 25 weight percent ethylene as determined by infrared. The blend had a melt index of 0.25 and a density of about 0.92. The environmental stress cracking rating of the blend was in excess of 1000 hours as determined by ASTM D–1693 60T. Film having a thickness of 7 mils was formed by the blown tubing method from this composition. This film had a tensile strength in the machine direction of 3500 p.s.i. and in the transverse direction of 2700 p.s.i. Elongation in both the machine and transverse direction was 890 percent. The Elemendorf tear rating of the film was 124 in the machine direction and 350 in the transverse direction. The impact strength as determined by the dart drop method, using a 2-inch dart from a height of 5 feet, was 756 grams. Bag prepared from the film was also tested for impact strength by filling a bag with 50 pounds of polyethylene pellets and dropping it from various heights onto a concrete floor. The bag was able to withstand a drop of 12 feet without breaking. A bag prepared from 10 mil film of 0.95 density ethylene/butene copolymer alone under similar conditions failed on a drop from a height of less than 4 feet.

*Example II*

Ethylene polymer was prepared according to the procedure described in the Hogan and Banks application using a 20 gallon reactor. The following conditions were employed in the polymerization reaction:

Temperature, ° F. _____ 280
Pressure, p.s.i. _____ 420
Chromium oxide catalyst, weight percent _____ 0.6
Chromium on catalyst, weight percent _____ 2.5
Cyclohexane solvent, lb./hr. _____ 35
Ethylene, lb./hr. _____ 5.6
Polymer concentration in solution, weight percent __ 8.0

Several batches of polymer were obtained and blended to give a homogeneous product. Properties obtained with this polyethylene are given in Table I.

A 60/40 ethylene-propylene copolymer was prepared accordnig to the process previously described. Pertinent data relating to the ploymerization are as follows:

Catalyst:
    Tri-isobutyl aluminum _____ 5 parts by weight.
    Titanium tetrachloride _____ 3.5 parts by weight.
Reaction time _____ 3 hrs., 40 mins.
Temperature _____ 65–85° C.
Pressure _____ 60 p.s.i.
$C_2/C_3$ ratio in feed _____ 60/40.

The catalyst was dispersed in the solvent (about 1200 parts by weight of cyclohexane) and a total of 272 parts of ethylene and 182 of propylene was metered into the reaction vessel over the 3 hr. 40 min. reaction period.

Blends of the polyethylene and the 60/40 copolymer of ethylene and propylene were prepared by milling in a Banbury mixer for 10 minutes at 300 F. The physical properties of blends containing 0, 10, 20, 25 and 100 percent by weight of the 60/40 copolymer are reported in Table I, under data columns 1 through 5 respectively. The physical properites were measured according to ASTM procedures given in the footnotes to the table. The density, however, was measured on a compression molded specimen by flotation in a mixture of methylcyclohexane and carbon tetrachloride.

TABLE I.—COMPOSITION AND PHYSICAL PROPERTIES OF THE RESINS

| Composition of resin, percent by weight: | 1 | 2 | 3 | 4 | 5 | 6 | 7 | 8 | 9 |
|---|---|---|---|---|---|---|---|---|---|
| PART A | | | | | | | | | |
| Ethylene polymer | 100 | 90 | 80 | 75 | 0 | 90 | 80 | 0 | 0 |
| 60/40 ethylene-propylene polymer | 0 | 10 | 20 | 25 | 100 | 0 | 0 | 0 | 0 |
| Propylene polymer | 0 | 0 | 0 | 0 | 0 | 10 | 20 | 0 | 0 |
| Ethylene-propylene polymer | 0 | 0 | 0 | 0 | 0 | 0 | 0 | [1] 100 | [2] 100 |
| PART B | | | | | | | | | |
| Physical properties of resins: [3] | | | | | | | | | |
| Density, g./cc. | 0.962 | 0.949 | 0.944 | 0.939 | [4] 0.854 | 0.949 | 0.940 | 0.943 | 0.936 |
| Tensile strength, p.s.i. | 4,401 | 3,680 | 3,058 | 2,655 | | 3,790 | 2,630 | 3,170 | 2,520 |
| Elongation, percent | 40 | 25 | 29 | 50 | 410 | 27 | 14 | 37 | 316 |
| Flex temp., °F. | +70 | +43 | −10 | −20 | −85 | +29 | +34 | −12 | −20 |
| Stiffness, p.s.i. | 119,000 | 100,000 | 93,000 | 68,000 | | 139,000 | 93,000 | 75,000 | 52,300 |
| Heat distortion temp., °F. | 162 | 143 | 134 | 128 | | | | | |
| Melt index | 0.865 | | | 0.844 | [4] 1.405 | | | 0.25 | 0.19 |
| Impact strength, ft./lb./in. | 2.9 | 4.69 | 6.15 | 7.63 | | 1.99 | 1.17 | 2.9 | 3.09 |

[1] A 90/10 ethylene-propylene copolymer.
[2] A 93/7 ethylene-propylene copolymer.
[3] The pertinent ASTM procedures are: tensile strength and elongation, D412-51T (Die C); flex temperature D1043-49T; stiffness D747-50; heat distortion, D-648-45T; melt index D-1238-52T; impact strength, D-256-54T.
[4] The copolymer was so weak structurally (crumbly in nature) that it was not practical to run several of the tests. By visual observation it was obvious that this material had an impact strength less than 1 and a tensile strength of much less than 1,000.

The data given under data columns 1 through 5 show that admixture of the polyethylene with the copolymer results in marked improvement in the impact strength. This is surprising in that the copolymer itself does not have a measurable impact strength or other highly satisfactory properties. Thus the copolymer can be described as slightly rubbery and lacking stiffness or tensile strength.

It is further important to note that the blends reported in Table I have properties which cannot be predicted from the computed ratio of ethylene and propylene radicals which comprise the mixture. For example, the blend of 80 parts of polyethylene with 20 parts of the 60/40 copolymer might be considered analogous to a 92/8 copolymer of ethylene-propylene. Data under columns 8 and 9 give the properties of 90/10 and 93/7 copolymers which were prepared in a manner closely analogous to that described for the polyethylene. These 90/10 and 93/7 copolymers have an impact strength of 2.9 and 3.09, respectively, as compared with a value of 6.15 reported for the blend containing 20 parts of the 60/40 copolymer.

TABLE II.—THERMAL STRESS CRACKING OF RESINS

| Composition of blend, weight percent | | Thermal stress cracking,[2] hr. |
|---|---|---|
| Polyethylene | 60/40 copolymer [1] | |
| 100 | 0 | 20 |
| 80 | 20 | 140 |

[1] 60 parts ethylene to 40 parts propylene in the feed.
[2] This was determined at 70° C in air using a procedure devised by De Coste, Malm and Wallder of Bell Telephone Laboratories for environmental stress cracking (outlined in Ind. and Eng. Chem., 43,117 (1951)).

Still another marked advantage results from the practice of this invention. Table II shows that the thermal stress cracking of the blend with the copolymer has a value greater than 140 hours as compared with a value of 20 hours for the polyethylene alone. The thermal stress cracking was measured on a specimen measuring 0.5" x 1.5" with a thickness of .0625" which was cut from a compression molded slab. A razor slit 0.85" long and .020"−.025" deep was cut parallel to and equidistant from the sides measuring 1.5 inches. The specimens were then bent 180 degrees perpendicular to and across the medium portion of the razor slit and placed into a 5/32" metal channel. The channel was subsequently placed in an oven at 70 C±2°. The time in hours for the specimens to fail completely was noted and recorded as the value for the thermal stress cracking.

*Example III*

A copolymer of ethylene and 1-butene having a density of 0.950 and a melt index of 0.3 was blended with various amounts of amorphous copolymers of ethylene and propylene. Injection molded spencimens of the original polymer and the blends were tested for Izod impact strength and the values obtained are given in the following table:

IZOD IMPACT STRENGTH (FOOT-POUNDS PER INCH)

| | Weight percent EPR in blend [2] | | | |
|---|---|---|---|---|
| | 0 | 10 | 25 | 40 |
| Weight percent propylene in ethylene-propylene rubber: | | | | |
| 33 | 3.9 | 7.0 | 11.8 | 10.2 |
| 60 [1] | 3.9 | 8.7 | 12.6 | 10.0 |
| 72 | 3.9 | 7.8 | 12.0 | 10.4 |

[1] A blend of copolymers containing 33 and 72 weight percent propylene.
[2] Complete breaks were not observed for the specimens containing EPR.

The ethylene-propylene rubbers alone had no measurable Izod impact strength. The above data demonstrate a remarkable improvement in impact strength for the blends over that of the high density ethylene copolymer alone.

*Example IV*

A homopolymer of ethylene having a density of 0.960, a melt index of 0.2, and known to have superior impact strength was blended with various amorphous ethylene-propylene copolymers to determine if the impact strength could be further improved. Injection molded specimens were used and the results are shown below:

IZOD IMPACT STRENGTH (FOOT-POUNDS PER INCH)

| Weight percent propylene in ethylene-propylene rubber: | Weight percent EPR in blend [2] | | |
|---|---|---|---|
| | 0 | 10 | 25 |
| 33 | 11.3 | 13.6 | 13.9 |
| 60 [1] | 11.3 | 17.0 | 16.1 |
| 72 | 11.3 | 15.3 | 14.6 |

[1] A blend of copolymers containing 33 and 72 weight percent propylene.
[2] Complete breaks were not observed for the specimens containing EPR.

The ethylene-propylene rubbers alone had no measurable Izod impact strength. The above data show that even the high density polyethylenes having high impact strength can be improved with from 1 to 25 weight percent amorphous ethylene-propylene copolymer.

As will be apparent to those skilled in the art, various modifications can be made in my invention without departing from the spirit or scope thereof.

The ethylene-propylene copolymer used in Example II was prepared in such a manner that the ratio of ethylene and propylene incorporated in the polymer was substantially the same as the ratio of these monomers in the feed. The ethylene-propylene copolymers used in Examples I, III and IV were commercial polymers and the propylene contents were determined by infrared analysis. These polymers were substantially amorphous as indicated by the substantial absence of crystallinity. The crystallinity of the propylene portion is characterized by the relative intensity of the 10.1 and 11.9 micron bands. Ethylene crystallinity is observed as a doublet near 13.8 microns. The following procedure which was used can be employed to determine the propylene content of substantially amorphous ethylene-propylene rubber. The ethylene content is 100 minus the weight percent propylene.

Films of suitable thickness are prepared in the following ways depending on the consistency of the copolymers: as a smear between salt plates, pressed between unheated plattens or pressed in a heated mold. The infrared spectra are obtained of these films using a double beam instrument on which a given instrument program can be accurately reproduced. The instrument is calibrated using a copolymer in which the propylene content is known as a secondary standard. The following equation is used to determine experimentally an extinction coefficient ($\epsilon$) for methyl branches using the absorption band at 8.65 microns.

$$\epsilon_{(8.65)} = \frac{A_{(8.65)} (14{,}000)}{(tPN_{CH_3}) 10^3}$$

where $N_{CH_3}$ = number of methyl branches per 1,000 carbon atoms in the secondary standard
$t$ = thickness in centimeters
$P$ = density (gm./cc.)
$A_{8.65}$ = absorbance at 8.65 microns
$\epsilon_{8.65}$ = extinction coefficient for methyl branches at 8.65

The extinction coefficient for a given instrument and program was found to be 2.66 liters cm.$^{-1}$ mol$^{-1}$ for ethylene-propylene copolymers displaying amorphous structure as evidenced by their infrared spectra. The spectrum of the copolymer from 2 to 15 microns is recorded and examined for the presence of impurities which would cast doubt on the quantitative results obtained. Some films may be of such consistency as to make a physical measurement of the thickness impossible. In this case one should ratio the absorption band at 2.34 microns to the same band in a copolymer film of known thickness. The reference film should be of a copolymer which can be molded into a right circular cylinder such that the thickness can be accurately measured by physical means. The baseline absorbance at 8.65 microns is measured using a line tangent to the points of maximum transmission at approximately 8.25 and 9.0 microns. The above equation can then be used with the experimentally determined extinction coefficient to arrive at the number of methyl branches per 1,000 carbon atoms which can be assumed to be the same as the number of moles of propylene per 1,000 carbon atoms. This figure multiplied by 0.3 provides the weight per cent propylene present in the polymer.

I claim:

1. As a new composition of matter, a blend of from about 60 to about 90 weight percent of a first copolymer of ethylene and at least one higher homologue, said first copolymer having a density of at least 0.940 to 20° C. and a crystallinity of at least about 70 percent at normal room temperature, and from about 10 to about 40 weight percent of a second copolymer of ethylene and at least one higher homologue thereof, said second copolymer being substantially amorphous and containing from 35 to 70 weight percent ethylene.

2. As a new composition of matter, a blend of from about 60 to about 90 weight percent ethylene/1-butene copolymer and from about 10 to about 40 weight percent ethylene-propylene copolymer, said ethylene/butene copolymer having a density of at least 0.940 gram per cubic centimeter at 20° C. and a crystallinity of at least about 70 percent at normal room temperature, and said ethylene-propylene copolymer containing from 35 to 70 weight percent ethylene.

3. As a new composition of matter, a blend of 10 to 40 weight percent ethylene-propylene copolymer, said ethylene-propylene copolymer containing from about 28 to about 67 weight percent ethylene, and from 60 to 90 weight percent copolymer of ethylene and 1-butene having a density of 0.946 to 0.954 gram per cubic centimeter at 20° C. and a crystallinity of at least about 70 percent at normal room temperature.

4. A film formed from a thermoplastic blend consisting essentially of from 65 to 75 weight percent of a first copolymer of ethylene and 1-butene, said first copolymer having a density in the range of 0.948 to 0.952 gram per cubic centimeter at 20° C. and a crystallinity of at least about 70 percent at normal room temperature, and from 25 to 35 weight percent of a second copolymer of ethylene and propylene, said second copolymer containing from 35 to 70 weight percent of ethylene.

5. A bag fabricated from a film of blended thermoplastic consisting essentially of from 68 to 72 weight percent of a first copolymer of ethylene and 1-butene, said first copolymer having a density in the range of 0.948 to 0.952 gram per cubic centimeter at 20° C. and a crystallinity of at least about 70 percent at normal room temperature, and from 32 to 28 weight percent of a second copolymer of ethylene and propylene, said second copolymer containing from 20 to 30 weight percent ethylene.

6. A bag having a wall thickness in the range of 4 to 9 mils and fabricated from a film of blended thermoplastic consisting essentially of about 70 weight percent ethylene/1-butene copolymer having a density of about 0.950 gram per cubic centimeter at 20° C. and a crystallinity of at least about 70 percent at normal room temperature and about 30 weight percent of an ethylene-propylene copolymer containing about 25 weight percent ethylene.

7. As a new composition of matter a blend of normally solid polyethylene having a density in the range 0.94 to 0.962 at 20° C. and a crystallinity of at least 70 percent at normal room temperatures and ethylene-propylene copolymer, said copolymer containing from 35 to 70 percent by weight of ethylene, and between about 10 and about 25 percent by weight of the total blend being said copolymer.

8. As a new composition of matter a blend of normally solid polyethylene having a density in the range 0.94 to 0.962 at 20° C. and a crystallinity of at least 70 percent at normal room temperatures and ethylene-propylene copolymer, said copolymer containing about 60 percent by weight of ethylene, and between about 10 and about 25 percent by weight of the total blend being said copolymer.

References Cited by the Examiner

UNITED STATES PATENTS

| | | | |
|---|---|---|---|
| 2,691,647 | 10/1954 | Field et al. | 260—897 |
| 2,692,257 | 10/1954 | Zletz | 260—897 |
| 3,179,719 | 4/1965 | Cines | 260—897 |

OTHER REFERENCES

Neumann et al., Modern Plastics, August 1955, pp. 117–120.

MURRAY TILLMAN, *Primary Examiner.*

E. B. WOODRUFF, *Assistant Examiner.*